(12) United States Patent
Ozawa et al.

(10) Patent No.: US 7,492,572 B2
(45) Date of Patent: Feb. 17, 2009

(54) ELECTROLYTIC CAPACITOR MANUFACTURING METHOD

(75) Inventors: Masashi Ozawa, Tokyo (JP); Masayuki Takeda, Ibaraki (JP); Makoto Ue, Ibaraki (JP)

(73) Assignees: Nippon Chemi-Con Corporation, Tokyo (JP); Mitsubishi Chemical Corporation, Tokyo (JP)

( * ) Notice: Subject to any disclaimer, the term of this patent is extended or adjusted under 35 U.S.C. 154(b) by 634 days.

(21) Appl. No.: 10/534,155

(22) PCT Filed: Nov. 7, 2003

(86) PCT No.: PCT/JP03/14219

§ 371 (c)(1),
(2), (4) Date: Nov. 7, 2005

(87) PCT Pub. No.: WO2004/042760

PCT Pub. Date: May 21, 2004

(65) Prior Publication Data

US 2006/0127566 A1  Jun. 15, 2006

(30) Foreign Application Priority Data

Nov. 8, 2002 (JP) .............................. 2002-326019
Nov. 8, 2002 (JP) .............................. 2002-326028
Nov. 11, 2002 (JP) ............................. 2002-326724

(51) Int. Cl.
*H01G 9/00* (2006.01)
*H01G 4/228* (2006.01)

(52) U.S. Cl. ...................................... 361/504; 361/518

(58) Field of Classification Search ................. 361/503, 361/518

See application file for complete search history.

(56) References Cited

U.S. PATENT DOCUMENTS

| RE31,743 E | 11/1984 | Arora et al. |
| 6,219,224 B1 * | 4/2001 | Honda ......................... 361/537 |
| 6,262,879 B1 | 7/2001 | Nitta et al. |
| 6,519,137 B1 * | 2/2003 | Nitta et al. ................... 361/525 |
| 6,808,615 B2 * | 10/2004 | Lessner et al. ............... 205/324 |
| 2004/0095708 A1 | 5/2004 | Takeda et al. |

FOREIGN PATENT DOCUMENTS

| JP | 05-029179 | 2/1993 |
| JP | 8321442 | 12/1996 |
| JP | 09-232189 | 9/1997 |
| JP | 10-032149 | 2/1998 |
| JP | 10-116629 | 5/1998 |
| JP | 11067600 A | 3/1999 |
| JP | 2001102265 A | 4/2001 |
| JP | 2003142346 | 5/2003 |

* cited by examiner

*Primary Examiner*—David S Blum
(74) *Attorney, Agent, or Firm*—Young & Thompson

(57) ABSTRACT

An electrolytic capacitor having a low impedance characteristic, having a high withstand voltage characteristic of 100V class, wherein the electrolytic capacitor provides an excellent high temperature life characteristic.

The electrolyte solution containing the aluminum tetrafluoride salt is used. The moisture content of the capacitor element is adjusted to 0.7% by weight or less, wit respect to the weight of the capacitor element, preferably 0.5% by weight or less, and most preferably 0.4% by weight or less. In this way, the electrolytic capacitor having the low impedance characteristic and the high resistance voltage characteristic, and the excellent high temperature life characteristic is provided.

3 Claims, No Drawings

ELECTROLYTIC CAPACITOR MANUFACTURING METHOD

FIELD OF THE INVENTION

The present invention relates to an electrolytic capacitor production method, especially, the production method of the electrolytic capacitor having a low impedance characteristic and a high withstand voltage characteristic.

BACKGROUND OF THE INVENTION

An electrolytic capacitor typically has an anode electrode foil made of a band-shaped high purity aluminum foil where the effective aluminum foil surface has been enlarged through etching process chemically or electrochemically, and an oxide film is formed on the surface, through a chemical process of treating the aluminum foil with a chemical solution such as ammonium borate aqueous solution and the like. A cathode electrode foil is also made of an etched aluminum foil of high purity. Capacitor element is formed by the anode electrode foil and the cathode electrode foil, wound together with intervening separator made of manila paper and the like. Next, the capacitor element, after impregnating with an electrolyte solution for driving the electrolytic capacitors, is housed into a bottomed outer case made of aluminum and the like. The outer case is equipped at the opening with a sealing member made of an elastic rubber, and is sealed by drawing.

Herewith, as electrolyte solution for driving the electrolytic capacitor having high conductivity, and to be impregnated to the capacitor element, wherein γ-butyrolactone is employed as the main solvent composed of quaternized cyclic amidin compounds (imidazolinium cation and imidazolium cation) as the cationic component and acid conjugated bases as the anionic component are dissolved therein as the solute (refer to Unexamined Published Japanese Patent Application No. H08-321449 and No. H08-321441)

However, due to the remarkable development of digital information devices in recent years, the high-speed driving frequency of micro-processor which is a heart of these electronic information devices is in progress. Accompanied by the increase in the power consumption of electronic components in the peripheral circuits, the ripple current is increased abnormally, and there is a strong demand for the electrolytic capacitors used in these circuits to have a low impedance characteristic.

Moreover, in the field of vehicles, with the recent tendency toward improved automobile functions, a low impedance characteristic is in high demand. By the way, the driving voltage of the vehicle circuit of 14V has been progressed to 42V accompanied by the increase in the power consumption. To comply with such a driving voltage, the electrolytic capacitor requires the withstand voltage characteristic of 28V and 84V and more. Furthermore, the electrolytic capacitors must withstand high temperature in this field, and a high temperature life characteristic is in demand.

However, the electrolytic capacitor cannot cope with the low impedance characteristic as such. Moreover, although the withstand voltage of 28V is capable, the limit is 30V, and it cannot respond to the requirement of the high withstand voltage of 84V and more.

DISCLOSURE OF INVENTION

The present invention aims to provide an electrolytic capacitor having a low impedance characteristic, having a high withstand voltage characteristic of 100V class, and an excellent high temperature life characteristic.

A production method of electrolytic capacitor, comprising a capacitor element fabricated by winding an anode electrode foil and a cathode electrode foil via a separator is impregnated with electrolyte solution, an outer case for housing the capacitor element, wherein the electrolyte solution in use contains an aluminum tetrafluoride salt, and controlling a moisture content of 0.7% by weight and less, the moisture of which is introduced to the capacitor element after the impregnation process of the electrolytic capacitor with the electrolyte solution.

BEST MODE TO CARRYING OUT THE INVENTION

The electrolyte solution of the electrolytic capacitor used in the present invention contains an aluminum tetrafluoride salt.

As the aluminum tetrafluoride salt constituting the aluminum tetrafluoride as anion component, examples of this salt include an ammonium salt, an amine salt, a quaternary ammonium salt, or a quaternary cyclic amidinium ion as cation component, can be used. Examples of an amine constituting the amine salt include a primary amine (such as methylamine, ethylamine, propylamine, butylamine, ethylenediamine, monoethanolamine, and the like); secondary amine (such as dimethylamine, diethylamine, dipropylamine, ethy-methylamine, diphenylamine, diethanolamine and the like); and tertiary amine (such as trimethylamine, triethylamine, tributylamine, triethanolamine, and the like). Examples of a quaternary ammonium constituting the quaternary ammonium salt include a tetraalkylammonium (such as tetramethylammonium, tetraethylammonium, tetrapropylammonium, tetrabutylammonium, methyltriethylammonium, di-methyldiethylammonium and the like) and a pyridinium (such as 1-methylpyridinium, 1-ethylpyridinium, 1,3-diethylpyridinium and the like).

Furthermore, as for salt containing the quaternized cyclic amidinium ion as a cationic component, the quaternized cyclic amidinium ion is a cation formed by quaternized a cyclic compound having an N,N,N'-substituted amidine group, and the following compounds are exemplified as the cyclic compound having an N,N,N'-substituted amidine group. They are an imidazole monocyclic compound (for example, an imidazole homologue, such as 1-methylimidazole, 1-phenylimidazole, 1,2-dimethyl-imidazole, 1-ethyl-2-methylimidazole, 2-ethyl-1-methylimidazole, 1,2-diethylimidazole, 1,2,4-trimethylimidazole and the like, an oxyalkyl derivative, such as 1-methyl-2-oxymethylimidazole, 1-methyl-2-oxyethyl-imidazole, and the like, a nitro derivative such as 1-methyl-4(5)-nitroimidazole, and the like, and an amino derivative such as 1,2-dimethyl-5(4)-aminoimidazole, and the like), a benzoimidazole compound (such as 1-methylbenzoimidazole, 1-methyl-2-benzylbenzoimidazole, 1-methyl-5(6)-nitrobenzo-imidazole and the like), a compound having a 2-imidazoline ring (such as 1-methylimidazoline, 1,2-dimethylimidazoline, 1,2,4-trimethylimidazoline, 1-methyl-2-phenylimidazoline, 1-ethyl-2-methylimidazoline, 1,4-dimethyl-2-ethyl-imidazoline, 1-methyl-2-ethoxymethylimidazoline, and the like), a compound having a tetrahydropyrimidine ring (such as 1-methyl-1,4,5,6-tetrahydropyrimidine, 1,2-dimethyl-1,4,5,6-tetrahydropyrimidine, 1,8-diazabicyclo[5,4,0] undecen-7,1,5-diazabicyclo[4,3,0]-nonene-5, and the like), and the like. The solvent in use for an electrolyte solution according to the present invention comprises a polar protic solvent, a polar aprotic solvent, and their mixture thereof. Examples of the polar protic solvent include monohydric alcohols (such as ethanol, propanol, butanol, pentanol, hexanol, cyclo-butanol, cyclo-pentanol, cyclo-hexanol, benzyl alcohol, and the like); and polyhydric alcohol and oxy alcohol compounds (such as ethylene glycol, propylene glycol, glycerine, methyl cellosolve, ethyle cellosolve, methoxy propylene glycol, dimethoxy propanol, and the like). Moreover, representative examples of the aprotic polar solvent include amide series (such as N-methylformamide, N,N-dimethylformamide, N-ethylformamide, N,N-diethylformamide, N-methyl acetamide, N,N-dimethyl acetamide, N-ethyl acetamide, N,N-diethyl acetamide, hexamethylphosphoric amide, and the like); lactone compounds (such as γ-butyrolactone, δ-valerolactone, γ-valerolactone, and the like); sulfolane series (such as sulfolane, 3-methyl sulfolane, 2,4-dimethyl sulfolane, and the like); cyclic amide compounds (such as N-methyl-2-pyrrolidone, and the like); carbonate compounds (such as ethylene carbonate, propylene carbonate, isobutylene carbonate, and the like); nitrile compound (such as acetonitrile, and the like); sulfoxide compound (such as dimethyl sulfoxide, and the like); 2-imidazolidinone solvents [for example, 1,3-dialkyl-2-imidazolidinone (such as 1,3-dimethyl-2-imidazolidinone, 1,3-diethyl-2-imidazoridinone, 1,3-di(n-propyl)-2-imidazoridinone, and the like); and 1,3,4-trialkyl-2-imidazoridinone (such as 1,3,4-trimethyl-2-imidazoridinone, and the like)], and the like.

Further, according to the production method of the present invention, a moisture content of the capacitor element of the electrolytic capacitor is 0.7% by weight and less, with respect to the total weight of the electrolytic capacitor. Herewith, the capacitor element is a cut-off portion of the lead wires of a capacitor element which is leading parts from the capacitor element. The following method is used to achieve the above moisture content. Namely, according to the production process of the electrolytic capacitor, after impregnating with the electrolyte solution, the moisture content increases before the electrolytic capacitor is sealed inside the outer case due to moisture absorption. Thus, this process should be carried out in the dry air, alternatively, the moisture inside the capacitor element should be removed prior to sealing, in this way, the moisture content inside the capacitor element is 0.7% by weight and less. For example, the electrolyte solution of the electrolytic capacitor having a low moisture content of 0.1% by weight and less is used, and previous to impregnation with the electrolyte solution, the capacitor element is left standing in the high temperature dry air for drying, and after impregnation, it is sealed into the outer case in the dry air such as glove box. A method of depressurizing and drying the capacitor element impregnated with electrolyte solution at 40 to 60° C. is employed as another example.

These became apparent based on the following considerations. That is, if the electrolyte solution of the electrolytic capacitor used in the present invention is left standing in the high moisture resistant air, the characteristics of the electrolytic capacitors have deteriorated. The moisture content of the electrolyte solution which is taken out from this capacitor element is 0.7% by weight and less, with respect to the total weight of the electrolytic capacitor. Moreover, if the conventional electrolyte solution using hydrogen phthalate 1-ethyl-2,3-dimethyl-imidazolinium is left standing in the likewise manner, its moisture content has increased up to 2% by weight. Further, if allow the moisture to be contained in the electrolyte solution used in the present invention, without having to impregnate to the capacitor element, and leave it standing in high temperature as it is, the electrolyte solution showed no deterioration in the characteristics. Based on these facts, if the moisture permeating to the capacitor element exceeds 0.7% by weight, the moisture reacts with the oxide film of the electrode foil, to bring about the deterioration of the electrolytic capacitor. The moisture that exceeds 0.7% by weight is thought to be consumed by this reaction. Henceforth, in regard to the production method of the electrolytic capacitor after impregnating this electrolyte solution, by making the moisture content contained in the capacitor element 0.7% by weight and less, the deterioration in the characteristics of the electrolytic capacitor is prevented.

Moreover, if the capacitor element impregnated with the electrolyte solution accordingly absorbs moisture during the production process afterwards, an uneven distribution of the moisture occurs considerably in the capacitor element. In other words, the moisture become abundant near an edge face of the capacitor element where the reactivity with the oxidation film gets especially large.

Accordingly, despite of the unevenness in moisture distribution as such, in order to not let it influence the characteristics of the electrolytic capacitor, an appropriate moisture content control of the electrolyte solution to be impregnated, is important to control the moisture content of 0.7% by weight, at the production process after impregnation. For this reason, for example, in case of introducing, in the electrolyte solution to be impregnated, the moisture content of 0.3% by weight, with respect to the total weight of the capacitor element, the allowed moisture absorption during the production process after impregnation is 0.4% by weight.

The electrolytic capacitor according to the production method of the present invention described above has a low impedance characteristic, and a high resistance voltage characteristic of 100V class, and an excellent high temperature life characteristic. That is to say, in the present invention, in regard to the production process after impregnating the electrolytic capacitor with the electrolyte solution, the moisture content contained in the capacitor element is controlled to 0.7% by weight or less. In case of conducting the high temperature life test by using the aluminum tetrafluoride salt, the reactivity of the electrolyte solution with the electrode foil caused by the moisture contained in the electrolytic capacitor will not get large without influencing to the characteristics the high temperature life characteristic is stabilized.

Further, in the present invention, an electrode foil subjected to phosphate treatment is used as the electrode foils. The present invention is still effective by using the electrode foil subjected to phosphate treatment as one of the cathode electrode foil and the anode electrode foil. Deterioration of both foils is prevented if this is applied to both foils so normally both foils are subjected to phosphate treatment. Normally, the aluminum foil of high purity is subjected to chemical or electrochemical etching to obtain the etching foil, however, as the electrode foil of the present invention, the etching foil obtained by performing the phosphate aqueous solution impregnation process before, during, or after the etching process is used as the cathode electrode foil. Further, as the anode electrode foil, the etching foil, the etching foil untreated with phosphate is subjected to phosphate synthesis, or the electrode foil that performed the phosphate impregnation process before, during, or after the chemical treatment is used.

Furthermore, the effect of the present invention improves by adding the phosphorous compounds to the electrolyte solution of the electrolytic capacitor described above. Examples of phosphorus compounds and salts thereof include orthophosphoric acid, phosphonous acid, hypophosphorus acid and their salts. As the salts of the phosphorus compounds, an ammonium salt, an aluminum salt, a sodium salt, a calcium salt, and a potassium salt can be used. Moreover, examples of phosphorous compound include ethyl phosphate, diethyl phosphate, butyl phosphate, dibutyl phosphate and the like; and phosphonate such as 1-hydroxyethylidene-1,1-diphosphonic acid, aminotrimethylene phosphonic acid, phenyl phosphonic acid, and the like. Moreover, examples of phosphinate include methyl phosphinate, butyl phosphinate, and the like.

Furthermore, examples of condensed phosphates include straight-chain condensed phosphates such as pyrophosphoric acid, tripolyphosphoric acid, tetrapolyphosphoric acid, and the like; cyclic condensed phosphates such as metaphosphate, hexametaphosphate, and the like, or the combination of the chain condensed phosphate and cyclic condensed phosphate. Further, as salts of these condensates, an ammonium salt, an aluminum salt, a sodium salt, a calcium salt, a potassium salt, and the like can be used.

The addition amount is ranging from 0.05 to 3% by weight, and preferably is ranging from 0.1 to 2% by weight.

The electrolytic capacitor of the present invention described above has a low impedance characteristic and a high withstand voltage of 100V class, and an excellent high temperature life characteristic. In other words, in case of performing the high temperature life test by using the aluminum tetrafluoride salt, the reactivity of the electrolyte solution with the electrode foil gets large due to the moisture inside the electrolyte solution, and the characteristics are affected. However, since the electrolytic capacitor of the present invention utilizes the electrode foil subjected to phosphate treatment, the reaction of the electrode foil with the electrolyte solution is controlled, whereby the high temperature life characteristic is stabilized.

Furthermore, as for the present invention, a partial cross-linking peroxide butyl rubber that added peroxide as cross-linking agent to a butyl rubber polymer comprised of isobutylene, isoprene, and divinylbenzene copolymer is used as the sealing member. Examples of vulcanizing agents used in the vulcanization of peroxides include ketone peroxides, peroxy ketals, hydro-peroxides, dialkyl peroxides, diacyl peroxides, peroxy dicarbonates, peroxy esters, and the like. Specific examples are 1,1-bis-t-butylperoxy-3,3,5-trimethylcyclohexane, n-butyl-4,4-bis-t-butylperoxy-valerate, dicumyl peroxide, t-butyl-peroxy-benzoate, di-t-butyl-peroxide, benzoyl peroxide, 1,3-bis (t-butyl peroxy-isopropyl) benzene, 2,5-dimethyl-2,5-di-t-butylperoxyl-hexene-3, t-butyl peroxy cumene, α, α'bis (t-butylperoxy) diisopropylbenzene, and the like.

According to the electrolytic capacitor of the present invention, a partial cross-linking peroxide butyl rubber that added peroxide as cross-linking agent to a butyl rubber polymer comprised of isobutylene, isoprene, and divinylbenzene copolymer is used as the sealing member. The electrolyte solution containing the aluminum tetrafluoride salt is used. The electrolytic capacitor of the present invention has a low impedance characteristic, and a high withstand voltage characteristic of 100V class. The high temperature life characteristic is improved further by the excellent high temperature characteristics of the electrolyte solution and the sealing member of the present invention.

Moreover, the quaternary cyclic amidinium compound tends to cause leakage due to the reaction with the hydroxyl ion generated in the vicinity of the cathode leading means, however, the electrolyte solution used in the present invention seemingly has a less reactivity with the hydroxyl ion, and owing to the excellent sealability between the perforation hole of the sealing member and the lead wire, the leakage characteristic is further improved by these synergistic effects.

EMBODIMENTS

Subsequently, the present invention will be explained by using the embodiments. A capacitor element is formed by winding an anode electrode foil and a cathode electrode foil via a separator. The anode electrode foil and the cathode electrode foil are connected respectively to a lead wire for leading the anode electrode and an another lead wire for leading the cathode electrode.

These lead wires are composed of connecting members being in contact with the electrode foils, the rod members having been molded integrally with the connecting members, and outer connecting members having been fixed at the tip of the rod members. The connecting member and the rod member are made from aluminum of 99% purity while the outer connecting member is made of a copper-plated steel wire (hereinafter CP wire). On the surfaces of the rod members of the lead wires at least, anode oxide films made of aluminum oxide are formed by a chemical treatment with ammonium phosphate aqueous solution. These lead wires are connected respectively to the electrode foils at the connecting members by means of stitching, ultrasonic welding, and the like.

The anode electrode foil is made of an aluminum foil of 99.9% purity in an acidic solution thereby enlarging the surface area thereof through the chemical or electrochemical etching process, and then subjecting the aluminum foil to a chemical treatment in an ammonium adipate aqueous solution, to thereby form an anode oxidation film on the surface thereof.

The capacitor element, which impregnates the electrolyte solution, is then housed into a bottomed outer case made of aluminum. The outer case 10 is provided at the opening with a sealing member and then sealed by drawing. The sealing member has perforation holes through which the lead wires are to be passed.

Herewith, in the present invention, prior to impregnation with electrolyte solution, the capacitor element is dried, and all the processes afterwards are conducted inside the glove box where the humidity is controlled. That is, the capacitor element is housed into the outer case, followed by sealing, aging, and decomposing, and the moisture content of element is measured.

The electrolyte solution containing 80% by weight of γ-butyrolactone and 20% by weight of 1-ethyl-2,3-dimethyl-imidazolinium is used.

The rated values of the electrolytic capacitors were 100 WV-22 μF. The characteristics of the electrolytic capacitors were evaluated. The test condition is 105° C. at 1,000 hours in the loaded state. The results are shown in (Table 1).

TABLE 1

| | Moisture content of element | Initial Characteristic | | 105° C./1000 hours | |
|---|---|---|---|---|---|
| | (wt %) | Cap (μF) | tan δ | Δ Cap (%) | Tan δ |
| Embody 1 | 0.2 | 22.9 | 0.011 | −0.6 | 0.014 |
| Embody 2 | 0.4 | 22.9 | 0.011 | −0.7 | 0.014 |
| Embody 3 | 0.7 | 22.9 | 0.011 | −0.8 | 0.016 |
| Compare | 0.9 | 22.9 | 0.011 | −2.8 | 0.019 |

Cap: electrostatic capacity
tan δ: tangent of dielectric loss
Δ Cap: change in electrostatic capacity As (Table 1) clearly shows, in the embodiments, the electrolytic capacitors of 100 WV class having the low impedance characteristics are implemented. The high temperature life characteristic of the third embodiment with the moisture content of 0.7% by weight is excellent compared with that of the comparative example of the moisture content of 0.9% by weight. Further, the moisture contents of 0.2% by weight and 0.4% by weight of the first and second embodiments respectively are excellent even more.

Further, in case of using, as the anode electrode foil and the cathode electrode foil, the electrode foils in use are subjected to phosphate treatment, so that the high temperature life characteristic further improves. Also, in case of using, as the sealing member, a partial cross-linking peroxide butyl rubber that added peroxide as cross-linking agent to a butyl rubber polymer comprised of isobutylene, isoprene, and divinylbenzene copolymer. Namely, the present invention achieves an extremely remarkable effect of preventing liquid leakage.

INDUSTRIAL APPLICABILITY

According to the present invention, the electrolyte solution containing the aluminum tetrafluoride salt is used, and a moisture content of 0.7% by weight and less is introduced to the capacitor element at the production process after impregnating the capacitor element with this electrolyte solution. The electrolytic capacitor having a low impedance characteristic and a high withstand voltage characteristic, and excellent high temperature life characteristic is provided.

The invention claimed is:

1. A method for producing an electrolytic capacitor obtained by winding an anode electrode foil, a cathode electrode foil and a separator to form a electrolytic capacitor and impregnating the electrolytic capacitor with a electrolyte solution, and housing it in an outer case, characterized in that a electrolyte solution containing aluminum tetrafluoride salt is used as said electrolyte solution, and that the moisture content of the capacitor element of 0.7% by weight and less is controlled in a production process after the electrolytic capacitor is impregnated with the electrolyte solution.

2. A method for producing an electrolytic capacitor according to claim 1, wherein an electrode foil subjected to a phosphate treatment is used as the anode electrode foil or the cathode electrode foil.

3. A method for producing an electrolytic capacitor according to claim 1, wherein a partial cross-linking peroxide butyl rubber that peroxide is added as cross-linking agent to a butyl rubber polymer comprising a copolymer of isobutylene, isoprene, and divinylbenzene is used as the sealing member.

* * * * *